United States Patent
Chan

(10) Patent No.: US 12,535,372 B2
(45) Date of Patent: Jan. 27, 2026

(54) TORQUE SENSING SYSTEM, A POWER CONTROL SYSTEM, A CONVERSION KIT WITH A TORQUE SENSING SYSTEM, AND A VEHICLE WITH A TORQUE SENSING SYSTEM

(71) Applicant: Yuk Chun Jon Chan, Hong Kong (CN)

(72) Inventor: Yuk Chun Jon Chan, Hong Kong (CN)

( * ) Notice: Subject to any disclaimer, the term of this patent is extended or adjusted under 35 U.S.C. 154(b) by 365 days.

(21) Appl. No.: 18/258,281

(22) PCT Filed: Jun. 22, 2022

(86) PCT No.: PCT/CN2022/100503
§ 371 (c)(1),
(2) Date: Jun. 19, 2023

(87) PCT Pub. No.: WO2023/245506
PCT Pub. Date: Dec. 28, 2023

(65) Prior Publication Data
US 2024/0377269 A1    Nov. 14, 2024

(51) Int. Cl.
*G01L 3/10* (2006.01)
*B62J 45/411* (2020.01)
(Continued)

(52) U.S. Cl.
CPC ............ *G01L 3/108* (2013.01); *F16D 41/069* (2013.01); *B62J 45/411* (2020.02); *B62J 45/413* (2020.02); *B62M 6/50* (2013.01)

(58) Field of Classification Search
CPC ......... G01L 3/108; G01L 3/04; F16D 41/069; B62J 45/413; B62J 45/411; B62M 6/50; B62D 6/10; G08C 17/02
See application file for complete search history.

(56) References Cited

U.S. PATENT DOCUMENTS

2013/0006463 A1    1/2013   Yang et al.
2020/0355564 A1    11/2020  Venzal et al.

FOREIGN PATENT DOCUMENTS

CN    201983887 U    9/2011
CN    203698571 U    7/2014
(Continued)

OTHER PUBLICATIONS

International Search Report mailed Dec. 16, 2022; PCT/CN2022/100503.
(Continued)

*Primary Examiner* — Brandi N Hopkins

(57) ABSTRACT

A torque sensing system is disclosed as including a stationary part with an electricity transmitting copper coil, and a rotating part rotatable relative to the stationary part about an axis of rotation, and having a body fixedly engageable with a vehicle spindle for receiving torque input from the vehicle spindle and simultaneous rotation about the axis of rotation, an outer circumferential surface for engagement with and transmitting said torque input to a one-way sprag clutch, four strain gauges fixedly engaged with the body for sensing torque applied on the body and outputting torque-related signals representing the magnitude of the torque applied on the body, an electricity receiving copper coil for wirelessly receiving electricity transmitted by the electricity transmitting copper coil of the stationary part, and a printed circuit board having a first major surface which is substantially perpendicular to the axis of rotation.

18 Claims, 12 Drawing Sheets

(51) Int. Cl.
    *B62J 45/413*     (2020.01)
    *B62J 50/22*     (2020.01)
    *F16D 41/069*     (2006.01)
    *B62M 6/50*     (2010.01)

(56) References Cited

FOREIGN PATENT DOCUMENTS

| | | | |
|---|---|---|---|
| CN | 111699364 A | 9/2020 | |
| EP | 3822154 A1 * | 5/2021 | ............ F16H 37/04 |
| GB | 2109568 A | 6/1983 | |
| JP | H0769234 B2 | 7/1995 | |
| WO | 2018/081996 A1 | 5/2018 | |

OTHER PUBLICATIONS

Written Opinion of the International Searching Authority mailed Dec. 16, 2022; PCT/CN2022/100503.

* cited by examiner

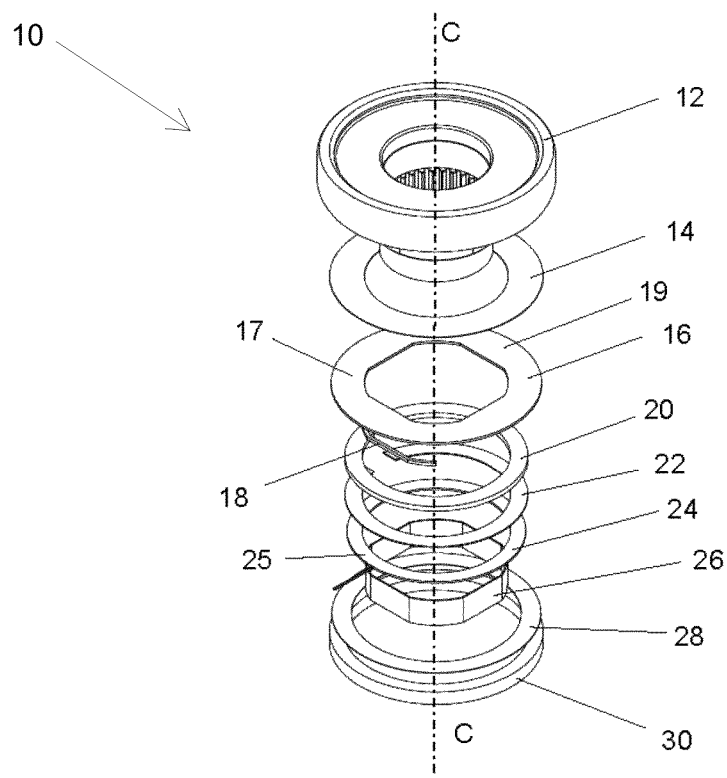
Fig. 1
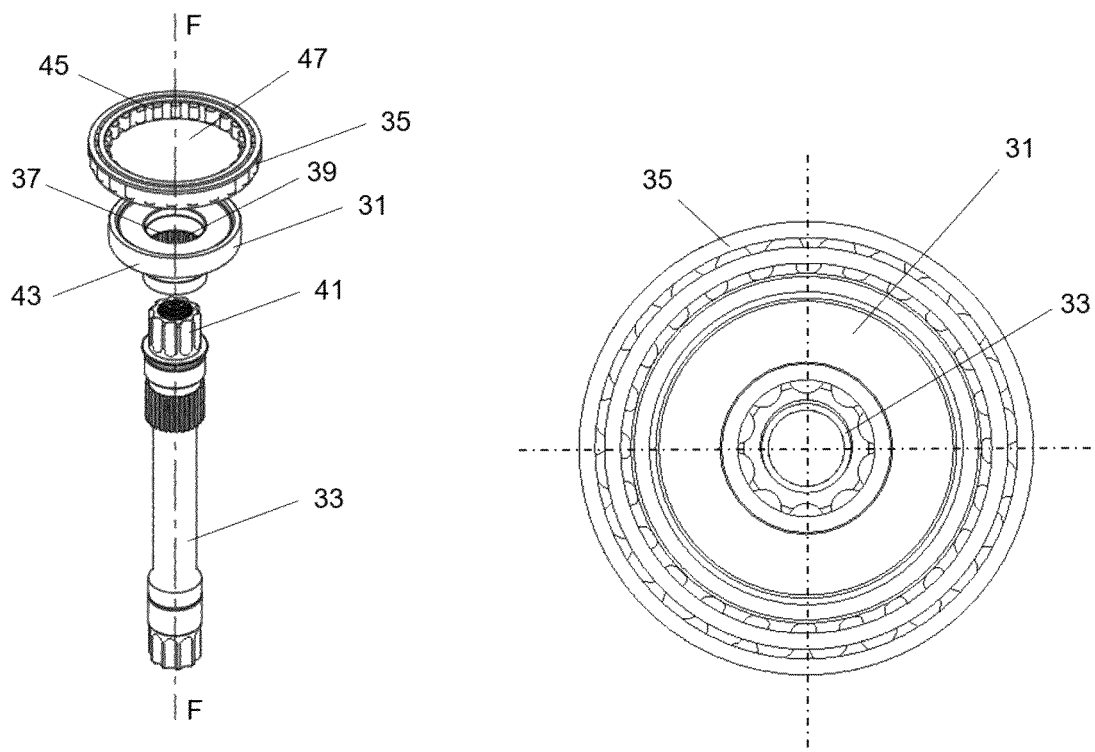
Fig. 2
Fig. 3

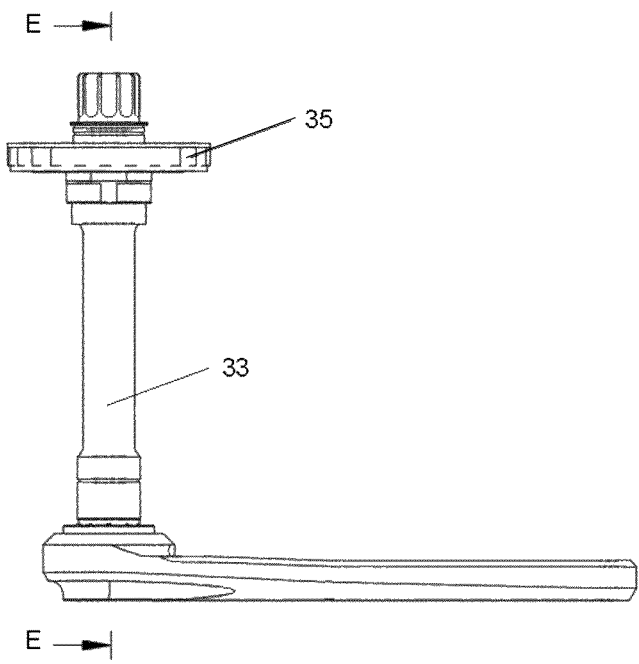
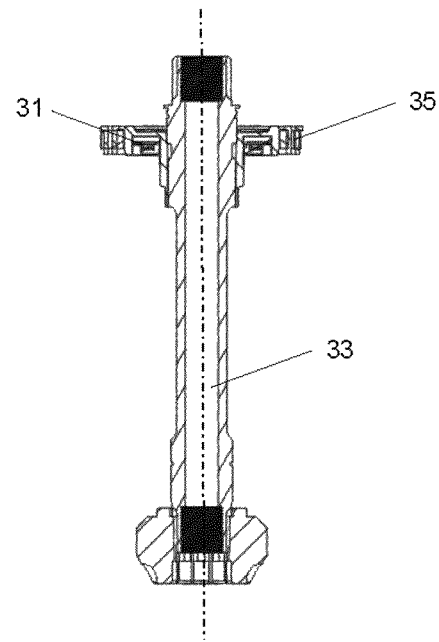
Fig. 4　　　　　　　　　　　Fig. 5
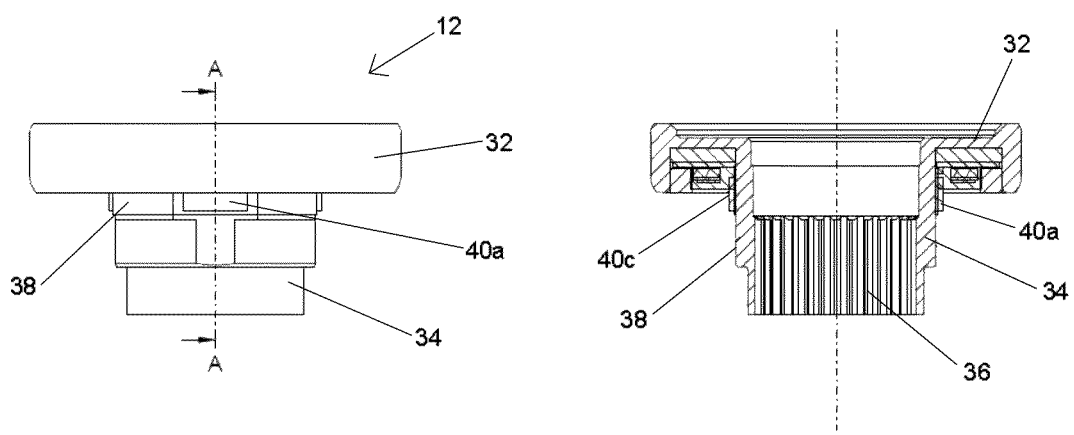
Fig. 6　　　　　　　　　　　Fig. 7

TORQUE SENSING SYSTEM, A POWER CONTROL SYSTEM, A CONVERSION KIT WITH A TORQUE SENSING SYSTEM, AND A VEHICLE WITH A TORQUE SENSING SYSTEM

This invention relates to a torque sensing system, in particular, such a torque sensing system suitable (but not limited) for sensing the torque of a vehicle spindle (e.g. a bicycle central shaft), a power control system for an electric or power-assisted vehicle with such a torque sensing system, a conversion kit with such a torque sensing system or such a power control system suitable (but not limited) for converting a manually-driven vehicle (e.g. a manually-driven bicycle) to an electric or power-assisted vehicle (e.g. an electric or power-assisted bicycle), and a vehicle (e.g. an electric or power-assisted bicycle) with such a torque sensing system, such a power control system for an electric or power-assisted vehicle, or such a conversion kit.

BACKGROUND OF THE INVENTION

There are in existence motorized vehicles (e.g. motorized bicycles) with an attached motor or engine and transmission used either to power the vehicle unassisted or to assist with pedalling. In power-assisted bicycles (also called an "ebike"), both pedals and a connected drive for rider-powered/pedal-powered propulsion are still retained. The pedals are connected with a central bicycle shaft (also called a central bicycle spindle) to allow a rider to pedal so as to propel the bicycle. When the rider pedals, a torque is applied via the pedals on the central spindle. To determine the power to be outputted by the motor or engine to assist the rider in propelling the bicycle (e.g. such as when ascending slopes or in long journeys), a strain gauge is used for measuring the torque applied on the central spindle caused by pedalling of the pedals. The strain gauge then generates torque-related signals based on the torque applied on it. Such torque-related signals are then used for determining (i) whether power is to be outputted by the motor or engine to assist the rider in propelling the bicycle, and (ii) if so, the magnitude of the power to be outputted.

It is common to convert a manually-driven vehicle (e.g. a conventional manually-driven bicycle) to an electric or power-assisted vehicle (e.g. an electric or power-assisted bicycle) by installing a conversion kit onto such a conventional manually-driven bicycle. In existing conversion kits, a strain gauge is usually provided on an outer circumferential surface of the central bicycle spindle.

Existing torque sensing systems incorporating strain gauge are known to face one or more of the following shortcomings:
(a) Too much axial space of the central bicycle spindle is occupied.
(b) Too much radial space of the central bicycle spindle is occupied.
(c) The sensitivity of standard magnetostrictive based torque sensor is not good.
(d) In terms of system for converting a manually-driven vehicle (e.g. a conventional manually-driven bicycle) to an electric or power-assisted vehicle (e.g. an electric or power-assisted bicycle), if standard torque sensor technology is used, due to the limited bottom bracket shell diameter on the frame, there is insufficient space for putting a torque sensor module if a spindle of a larger diameter (as in the case of the modern standard for mountain bike) is used.

It is thus an object of the present invention to provide a torque sensing system, a power control system, a conversion kit with such a torque sensing system or such a power control system, and a vehicle with such a torque sensing system, such a power control system or such a conversion kit, in which one or more of the aforesaid shortcomings is mitigated or at least to provide a useful alternative to the trade and public.

SUMMARY OF THE INVENTION

According to a first aspect of the present invention, there is provided torque sensing system including a first part with an electricity transmission member, and a second part rotatable relative to said first part about an axis of rotation, and having a body fixedly engageable with a vehicle spindle for receiving torque input from said vehicle spindle and simultaneous rotation about said axis of rotation, an engagement member for engagement with and transmitting said torque input to a one-way clutch, at least one strain gauge fixedly engaged with said body for sensing torque applied on said body and outputting torque-related signals representing the magnitude of said torque applied on said body, an electricity receiving member for wirelessly receiving electricity transmitted by said electricity transmission member of said first part, and a first printed circuit board having a first major surface which is substantially perpendicular to said axis of rotation.

According to a second aspect of the present invention, there is provided a power control system for an electric or power-assisted vehicle including a torque sensing system according to the first aspect of the present invention, further including at least one cadence sensor for sensing frequency of forward rotation and backward rotation of said vehicle spindle and outputting cadence-related signals representing said frequency of forward rotation and backward rotation of said vehicle spindle, and a controller for receiving said torque-related signals and said cadence-related signals and outputting operating signals at least partly on the basis of said torque-related signals and said cadence-related signals for operating a motor or engine operationally connected with said controller.

According to a third aspect of the present invention, there is provided a conversion kit for converting a manually-driven vehicle to an electric or power-assisted vehicle, said conversion kit including a torque sensing system according to the first aspect of the present invention or a power control system according to the second aspect of the present invention.

According to a fourth aspect of the present invention, there is provided a vehicle including a torque sensing system according to the first aspect of the present invention, or a power control system according to the second aspect of the present invention, or a conversion kit according to the third aspect of the present invention.

BRIEF DESCRIPTION OF THE DRAWINGS

Embodiments of the present invention will now be described, by way of examples only, with reference to the accompanying drawings, in which:

FIG. 1 is an exploded view of a rotating part of a torque sensing system according to an embodiment of the present invention, FIG. 2 shows perspective view of a one-way sprag clutch, the torque sensing system the rotating part of which being shown in FIG. 1, and a vehicle spindle (e.g. a bicycle spindle), FIG. 3 is a top view of the one-way sprag clutch, torque sensing system and bicycle spindle of FIG. 2 engaged with one another, FIG. 4 shows the one-way sprag clutch, torque sensing system and bicycle spindle of FIG. 2 engaged with one another and with the bicycle spindle engaged with a pedal part, FIG. 5 is a sectional view taken along the line E-E of FIG. 4, FIG. 6 is a front view of a body of the rotating part shown in FIG. 1, FIG. 7 is a sectional view of the body taken along the line A-A of FIG. 6.

DETAILED DESCRIPTION OF THE EMBODIMENTS

Figures 8, 9:
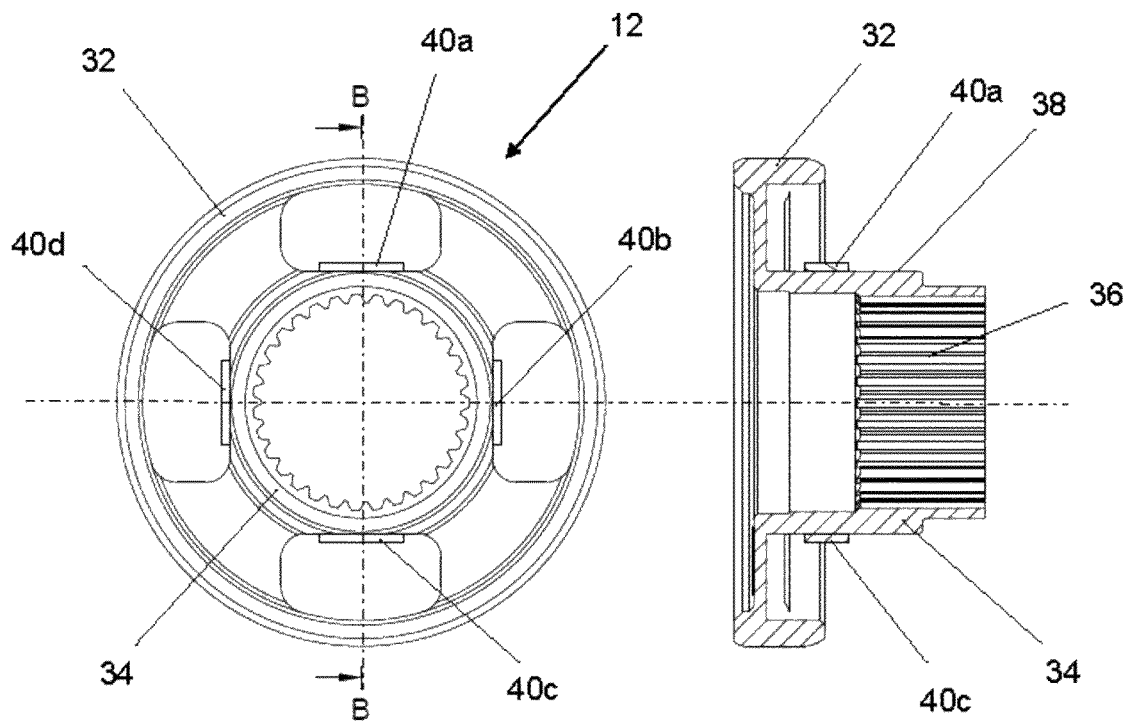
FIG. 8 is a bottom view of the body shown in FIG. 6.
FIG. 9 is a sectional view of the body taken along the line B-B of FIG. 8.

FIG. 1 shows an exploded view of a rotating part of a torque sensing system according to an embodiment of the present invention, the rotating part generally designated as 10. The rotating part 10 of the torque sensing system is fixedly engageable with a vehicle spindle (e.g. a bicycle central spindle) for simultaneous rotation about a common longitudinal axis of rotation, which coincides with its own longitudinal axis of rotation C-C.

The rotating part 10 includes, amongst other components:

a body 12, a first polyimide (PI) insulator 14, a printed circuit board (PCB) 16 with two opposite major surfaces (of which only one major surface 17 is shown) and at least one microprocessor 19 having at least wireless data-transmission and reception ("transceiving") and strain gauge calibration capability, an antenna 18, a rubber spacer 20, a magnetic insulator 22, a copper coil 24 with two opposite major surfaces (of which only one major surface 25 is shown), a magnetic insulation pad 26, a second PI insulator 28, and a magnetic ring 30 with multiple pole pairs.

As shown in FIGS. 2 to 5, a torque sensing system 31 (as assembled) is engaged with a bicycle spindle 33 and a one-way clutch, such as a one-way sprag clutch 35. The torque sensing system 31 has a hole 37 with grooves 39 through which splines 41 of the bicycle spindle 33 are allowed to be inserted to effect engagement between the bicycle spindle 33 and the torque sensor system 31 for simultaneous rotation about the axis of rotation F-F. The rotating part 10 of the torque sensing system 31 has an outer circumferential surface 43 for engagement with inner grooves 45 arranged along an inner surface of a hole 47 of the one-way sprag clutch 35. By way of engagement between the outer circumferential surface 43 of the rotating part 10 with the inner grooves 45 of the one-way sprag clutch 35, the torque input is transmitted from the rotating part 10 of the torque sensing 31 to the one-way sprag clutch 35. The torque sensing system 31, the bicycle spindle 33 and the one-way sprag clutch 35 are thus engaged with one another for simultaneous rotation about an axis F-F, which coincides with the longitudinal axis of rotation C-C of the rotating part 10.

The hole 47 of the one-way sprag clutch 35 is of such a size that, when duly assembled, the magnet ring 30, the PCB 16, the copper coil 24, and the microprocessor 19 of the rotating part 10, and the strain gauges 40a, 40b, 40c, 40d are at least partly received with the hole 47, thus achieving saving on space along the length of the vehicle spindle 33.

It can be seen that the major surface 17 of the printed circuit board (PCB) 16 and the major surface 25 of the copper coil 24 are parallel to each other, and are both perpendicular to the axis of rotation F-F.

Turning to FIGS. 6 to 9, it can be seen that the body 12 has a broader circular part 32 and a narrower cylindrical part 34 integrally formed with each other, with a common central longitudinal axis C-C. The body 12 may be made of metal, metal alloy, or other materials which are of sufficient strength suitable for the purpose. The cylindrical part 34 is hollow and is provided with a number of parallel grooves 36 in its interior surface for fixed engagement with a vehicle spindle (e.g. a central bicycle spindle) for simultaneous rotation about the central longitudinal axis C-C, which also constitutes the common axis of rotation of the body 12 (and thus the rotating part 10) and the vehicle spindle. The first PI insulator 14, printed circuit board 16, antenna 18, rubber spacer 20, magnetic insulator 22, copper coil 24, magnetic insulation pad 26, second PI insulator 28, and magnetic ring 30 are positioned co-axially around the cylindrical part 34 of the body 12 for simultaneous rotation with the body 12 about the common central longitudinal axis of rotation C-C.

Four strain gauges 40a, 40b, 40c, 40d are equi-angularly disposed on and around the outer surface 38 of the cylindrical part 34 of the body 12, and adjacent the broader circular part 32. Put another way, the four strain gauges 40a, 40b, 40c, 40d are positioned on the outer surface 38 such that each strain gauge is separated from the adjacent ones by 90°. Each of the strain gauges 40a, 40b, 40c, 40d is fixedly received on or within a respective space of the cylindrical part 34 of the body 12.

Figure 10:
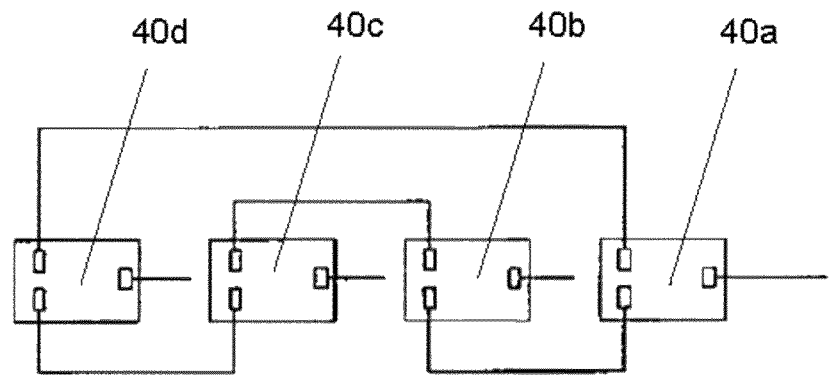
FIG. 10 is a first schematic view showing electrical connection of the four strain gauges fixedly engaged with the body shown in FIG. 6.
Figure 11:
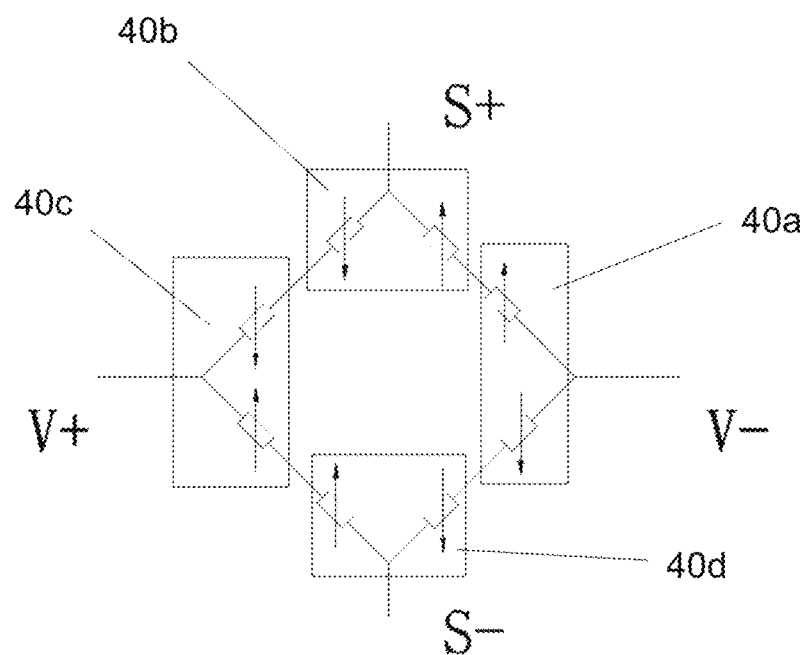
FIG. 11 is a second schematic view showing electrical connection of the four strain gauges.
Figure 12:
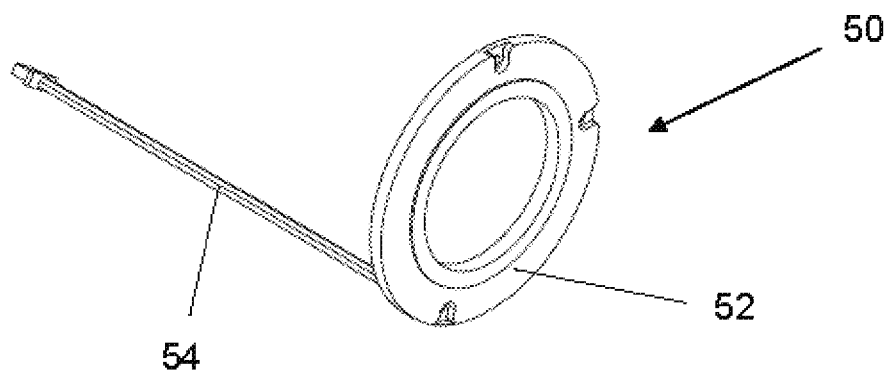
FIG. 12 is a perspective view of a stationary part of the torque sensing system according to an embodiment of the present invention.
Figure 13:
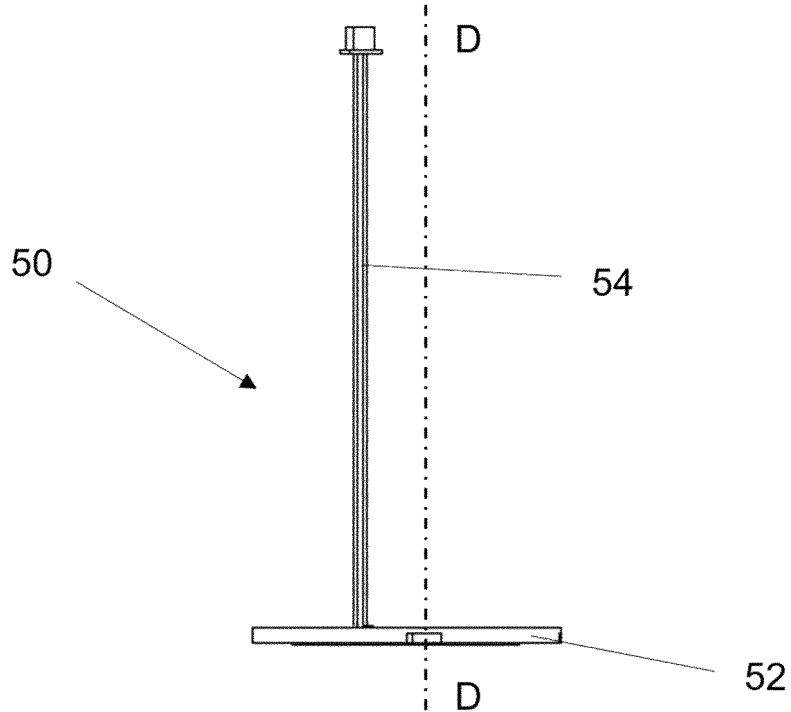
FIG. 13 is a front view of the stationary part shown in FIG. 12.
Figure 14:
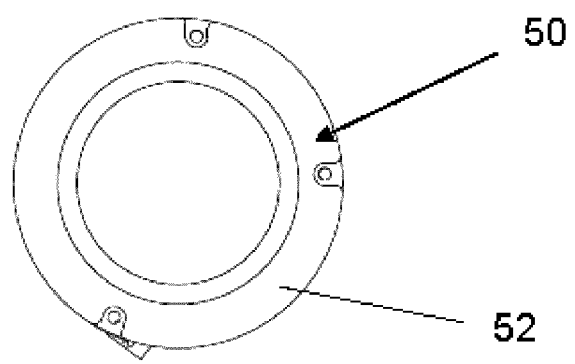
FIG. 14 is a bottom view of the stationary part shown in FIG. 12.

It can be seen from FIGS. 10 and 11 that the four strain gauges 40a, 40b, 40c, 40d are electrically connected with one another in series and in the form of a closed loop. More particular, it can be seen that a first end of the strain gauge 40a is electrically connected with a first end of the strain gauge 40b, a second end of the strain gauge 40b is electrically connected with a first end of the strain gauge 40c, a second end of the strain gauge 40c is electrically connected with a first end of the strain gauge 40d, and a second end of the strain gauge 40d is electrically connected with a second end of the strain gauge 40a.

Deformation of the strain gauges 40a, 40b, 40c, 40d caused by application of a torque on the vehicle spindle is measured and signals representative of the extent of deformation (and thus the magnitude of the applied torque) are generated and outputted by the strain gauges 40a, 40b, 40c, 40d. By way of the electrical connection between the strain gauges 40a, 40b, 40c, 40d and the equi-angular positioning of the strain gauges 40a, 40b, 40c, 40d on and around the outer surface 38 of the cylindrical part 34 of the body 12 enhances the stability, sensitivity and precision of measurement by the strain gauges 40a, 40b, 40c, 40d of the torque applied on the vehicle spindle. Such also assists in avoiding (or at least reducing) the occurrence of "dead zone," as torque is sensed by at least one of the four strain gauges 40a, 40b, 40c, 40d during the course of each cycle of pedalling.

FIGS. 12 to 15 show various views of a stationary part of the torque sensing system according to an embodiment of the present invention, the stationary part generally designated as 50. The stationary part 50 includes a generally annular part 52 and an elongate connector 54, which extends along a line parallel to a central longitudinal axis D-D of the annular part 52.

Figure 15:
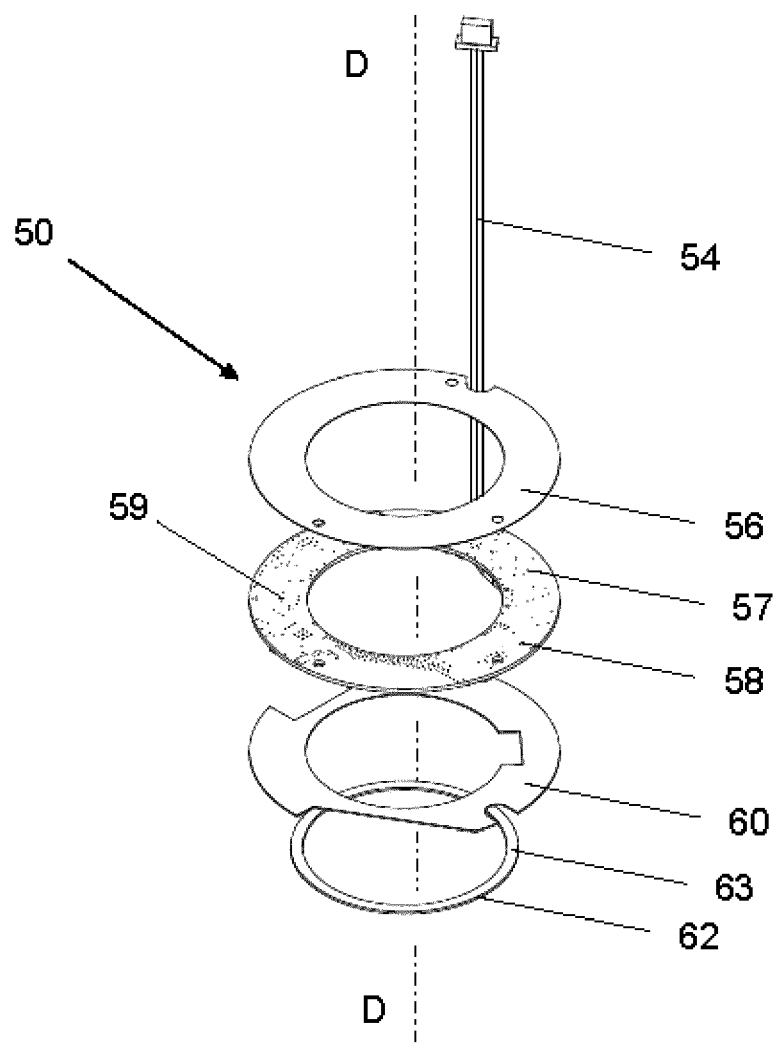
FIG. 15 is a perspective exploded view of the stationary part shown in FIG. 12.

As shown in more detail in FIG. 15, the annular part 52 of the stationary part 50 includes a PI insulation pad 56, a printed circuit board (PCB) 57 with two opposite major surfaces (of which only one 59 is shown) and at least a microprocessor 58 having at least wireless transmitting and receiving ("transceiving") capability, a magnetic insulation pad 60, and a copper coil 62 with two opposite major surfaces, of which only one 63 is shown. The PI insulation pad 56, printed circuit board (PCB) with the microprocessor 58, magnetic insulation pad 60, and copper coil 62 are stacked one on top of another coaxially about the central longitudinal axis D-D. The major surface 59 of the PCB 57 and the major surface 63 of the copper coil 62 are parallel to each other, and are both perpendicular to the axis of rotation F-F.

When the torque sensing system 31 is duly assembled, the rotating part 10 and the stationary part 50 are coupled with each other such that:
the central longitudinal axis of rotation C-C of the rotating part 10 coincides with the central longitudinal axis D-D of the stationary part 50 and the axis of rotation F-F,
the rotating part 10 is supported by one or more bearings for rotation relative to the stationary part 50 about the common axis C-C/D-D and the axis of rotation F-F,
the copper coil 24 of the rotating part 10 is electricity-transmissible wirelessly with the copper coil 62 of the stationary part 50, and
the printed circuit board (PCB) with the microprocessor 16 is data-transmissible wirelessly with the printed circuit board (PCB) with the microprocessor 58.

Figure 16:
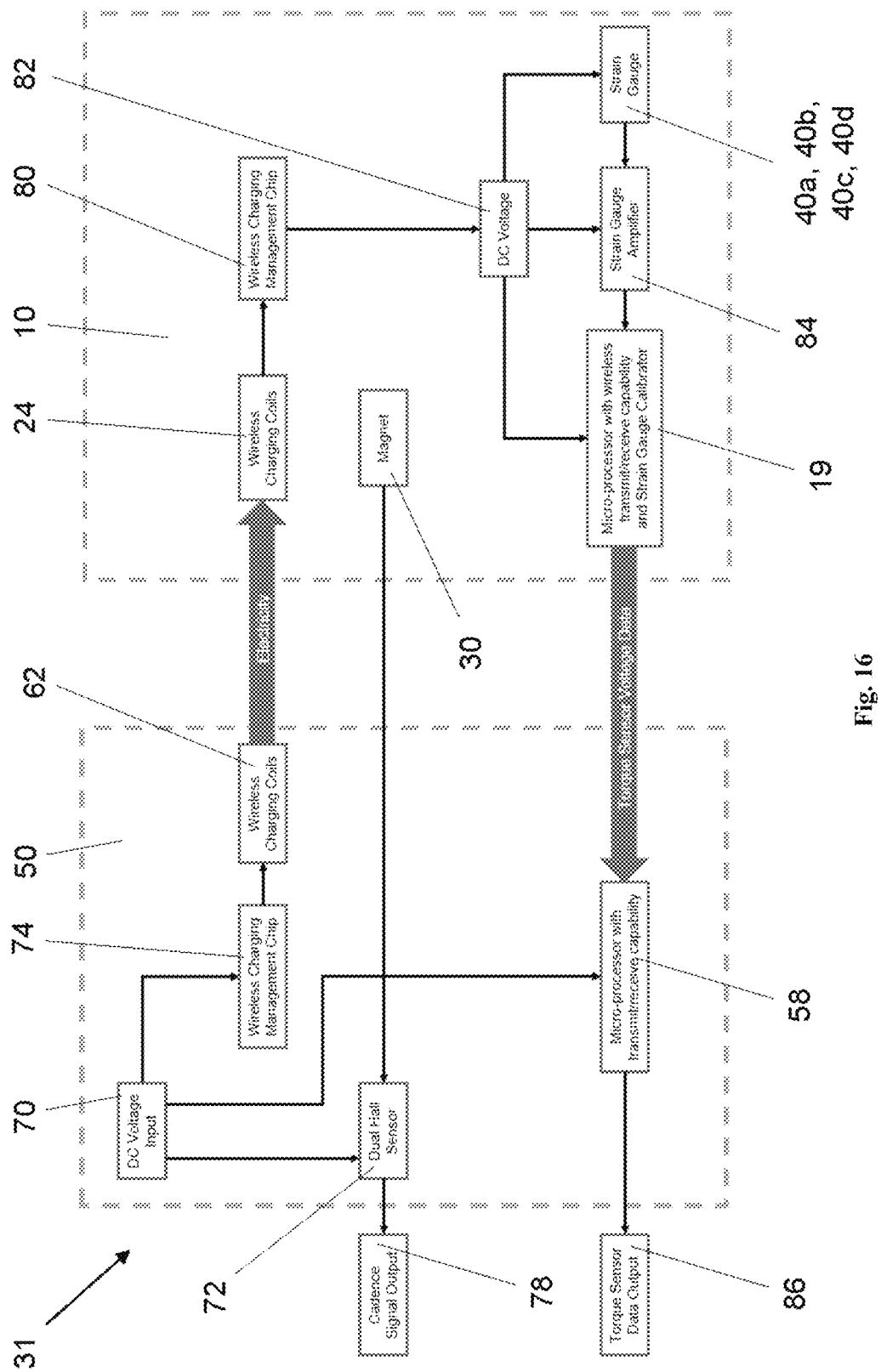
FIG. 16 is a schematic view of the torque sensing system according to an embodiment of the present invention.

FIG. 16 is a schematic view of a torque sensing system, generally designated as 31, formed of the rotating part 10 and the stationary part 50 discussed above. In use, the torque sensing system 31 is engaged with a vehicle such that the rotating part 10 is fixedly engaged with a vehicle spindle of the vehicle for simultaneous rotational movement.

The stationary part 50 includes a DC voltage power input 70 which provides power to a dual Hall sensor 72, a wireless charging management chip 74, and the microprocessor 58 with wireless transceiving capability. The dual Hall sensor 72 is operationally associated with the magnet ring 30 of the rotating part 10, which is rotatable simultaneously with the vehicle spindle, such that forward and backward rotation of the magnet ring 30 (brought about by corresponding forward and backward rotation of the vehicle spindle 33 (as sensed by the dual Hall sensor 72). As forward and backward rotation of the vehicle spindle 33 (and thus forward and backward of the magnet 30) has to be distinguished from each other, a dual Hall sensor 72 is used. The frequency of forward/backward rotation of the magnet ring 30 represents the frequency of forward/backward rotation of the vehicle spindle 33. The dual Hall sensor 72 senses the rotation of the magnet ring 30, and thereby generates and outputs cadence-related signals 78 on the basis of the frequency of forward/backward rotation of the magnet ring 30 as sensed by it.

The wireless charging management chip 74 controls transmission of electric power to the copper coil 62 for wireless transmission to the copper coil 24 of the rotating part 10. The electric power thus received is controlled by a wireless charging management chip 80 to be transmitted to a DC voltage source 82 for powering the strain gauges 40a, 40b, 40c, 40d, a strain gauge amplifier 84, and the printed circuit board (PCB) 16 with the microprocessor 19.

In response to torque applied on the vehicle spindle 33, e.g. by a rider, as sensed by the strain gauges 40a, 40b, 40c, 40d, the strain gauges 40a, 40b, 40c, 40d generate signals and output such signals to the strain gauge amplifier 84, to be subsequently transmitted to the printed circuit board (PCB) 16 with the microprocessor 19. The microprocessor 19 transmits such signals (as torque sensor voltage data) wirelessly to the microprocessor 58 of the stationary part 50, to be outputted as torque-related signals 86.

Figure 17:
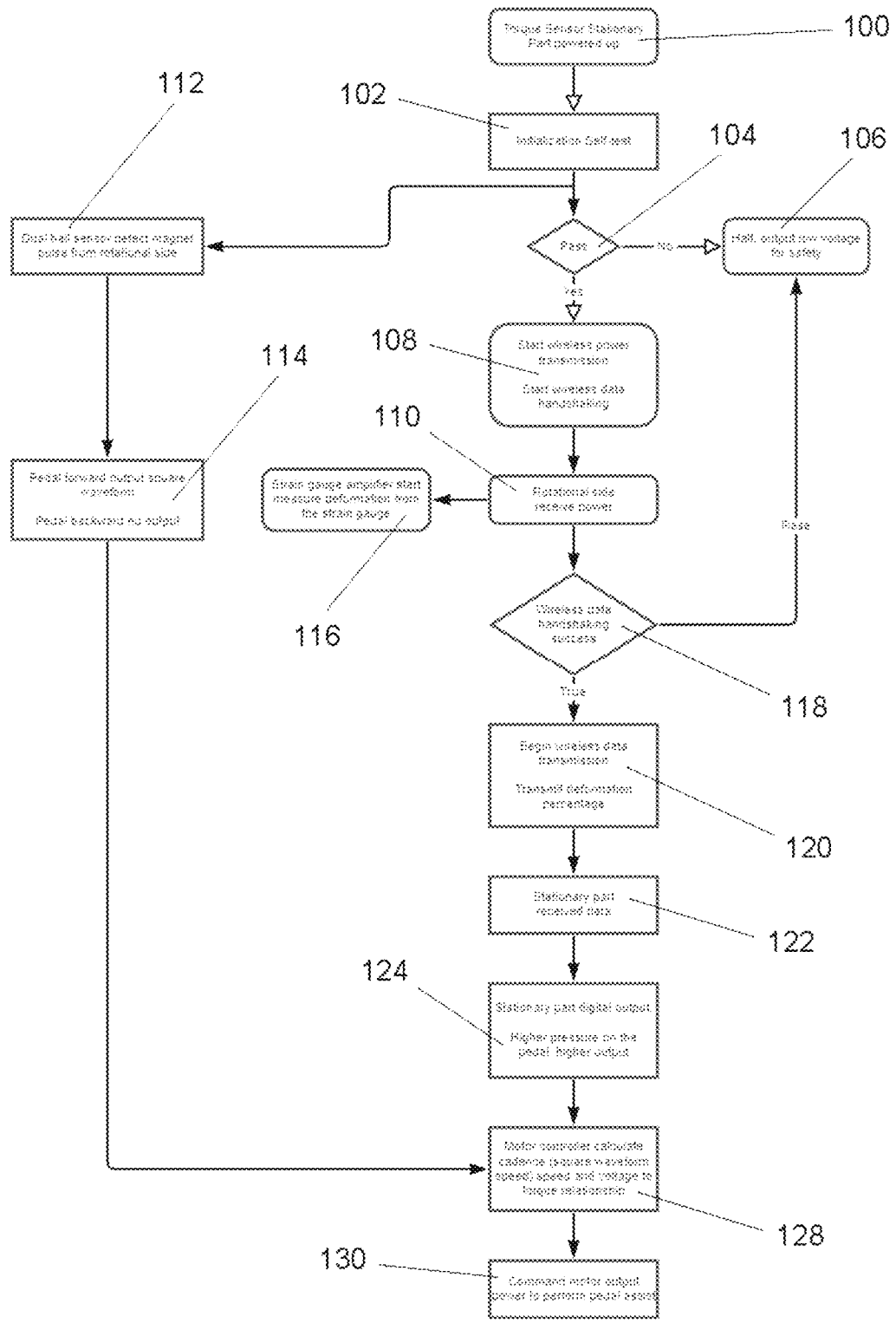
FIG. 17 is a flowchart showing steps of operation of the torque sensing system shown in FIG. 16.

FIG. 17 is a flowchart showing steps of operation of the torque sensing system 31. Firstly, the stationary part 50 of the torque sensing system 31 is powered up 100, and subsequently initialization and self-test are carried out 102. If initialization and/or self-test 104 fails, the operation halts and the system 31 outputs error signal for safety 106. On the other hand, if initialization and self-test are completed successfully 104, the system 31 starts wireless power transmission and starts wireless data handshaking 108 between the rotating part 10 and the stationary part 50. The rotating part 10 then receives power 110 from the stationary part 50 through the interaction between the copper coil 62 of the stationary part 50 and the copper coil 24 of the rotating part 10. Upon successful completion of initialization and self-test 104, the dual Hall sensor 72 detects magnetic pulse 112 brought about by the rotation of the magnet 30 of the rotating part 10. Upon detecting forward rotation of the magnet 30 (signifying forward rotation of the vehicle spindle), the dual Hall sensor 72 will output cadence-related signals in square waveform, whereas upon detecting backward rotation of the magnet 30 (signifying backward rotation of the vehicle spindle), the dual Hall sensor will not generate any output 114.

Upon the rotating part 10 receiving power 110, the strain gauge amplifier 84 then starts measuring deformation 116 from the strain gauges 40a, 40b, 40c, 40d. If wireless data handshaking is not successful 118, the operation halts and the system 31 outputs error signal for safety 106. If wireless data handshaking succeeds 118, wireless data transmission begins, and deformation data (such as deformation percentage) are transmitted 120. The stationary part 50 receives data 122 from the rotating part 10. A transmitter in the stationary part 50 then outputs 124 torque-related signals based on the signals received from the rotating part 10; the higher the pressure on the pedal, the higher the torque reading (e.g. in units of newton meter) from the transmitter in the stationary part 50.

A motor controller receives the torque-related signals from the transmitter and the cadence-related signals from the dual Hall sensor 72. The motor controller calculates the cadence speed and human power and torque reading 128, and outputs commands to operate the motor or engine (to which the motor controller is operationally connected) to output power to perform pedal assist 130.

As an example, a logic for controlling the operation of the motor/engine to provide pedal assist may be as follows:

Step 1: Obtain speed signals
  If the speed (as measured by a speed sensor having one or more magnets on the vehicle wheel(s)) is lower than a certain pre-set limit, e.g. 25 km/h, →go to Step 2
  Else→go to Step 4
Step 2: Detect cadence
  If cadence detected is 3 rounds per minute (rpm) or above, →go to Step 3
  Else→go to Step 4
Step 3: Controller reads torque sensor pressure
  If human pedal pressure is higher than a certain pre-set limit, the controller activates the motor so that motor current starts to ramp up, based on the torque reading, and go to Step 1
  Else→go to Step 1
Step 4: If speed is higher than a certain pre-set limit or cadence reading is below a certain pre-set limit (e.g. 3 rpm), the controller causes the motor to cut off its power. However, even in the absence of cadence signals, if the torque reading exceeds a certain threshold (thus signifying a high pressure on the vehicle spindle) the motor will start/continue to run to provide power assist.

As a corollary example:
Start
  Cadence: 10 rpm
  Human pressure: 20 Nm
  The motor power slowly ramps up from 0 W to 100 W
Middle
  Cadence: 20 rpm
  Human pressure: 25 Nm
  Average motor power is from 100 W to 200 W, based on human pedal pressure
End
  Cadence: 0 rpm
  Motor controller cuts out motor power, the motor power rapidly ramps down from 250 W to 0 W, regardless of human pressure.
  When the speed is above a certain pre-set limit, e.g. 25 km/h, the motor controller also cuts out motor power.

Figure 18:
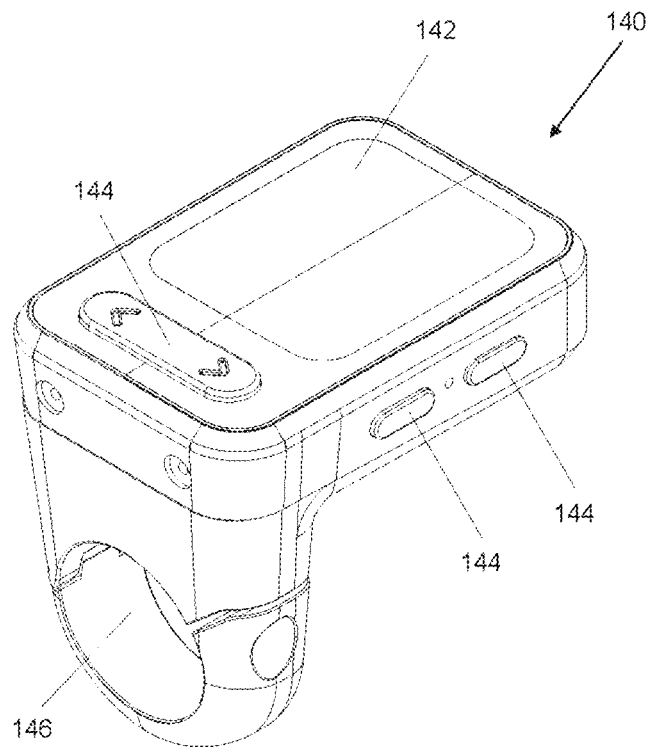
FIG. 18 is a perspective view of a visual display unit according to an embodiment of the present invention.
Figure 19:
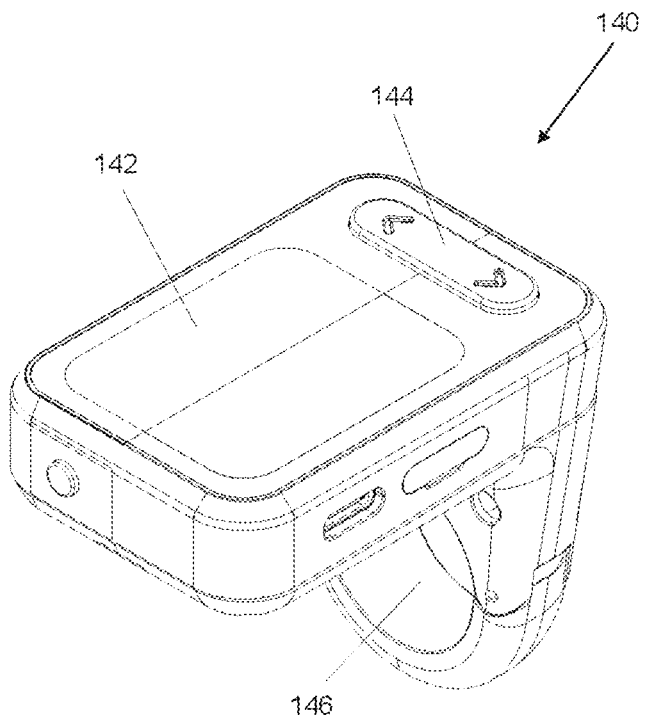
FIG. 19 is a further perspective view of the visual display unit shown in FIG. 18, and FIGS. 20 to 25 show six exemplary screen shots displayed on the visual display unit of FIG. 18.

In a vehicle (e.g. bicycle) installed with the torque sensing system 31 and the motor controller, a visual display unit (shown in FIGS. 18 and 19, designated generally as 140) may be installed and connected with the motor controller, so that operation parameters of the vehicle may be passed from the motor controller to the visual display unit 140 for display. Such operation parameters may include speed of the bicycle, trip distance, average speed, maximum speed, human power input, cadence, motor power, motor temperature, efficiency, elapsed time, elevation and altitude. The visual display unit 140 may also be electrically connected with the body of the rider so as to obtain and display physiological parameters of the rider. Such physiological parameters of the rider may include heartbeat rate and blood pressure.

The visual display unit 140 includes a touch screen 142 and buttons 144, all operable by a rider of the vehicle. The visual display unit 140 has an opening 146 through which a handlebar of the bicycle may be received so as to mount the visual display unit 140 to the bicycle. The visual display unit 140 may be data-communicable with a smart phone, through wired and/or wireless data connection, e.g. wifi.

Figure 20:
Figure 21:
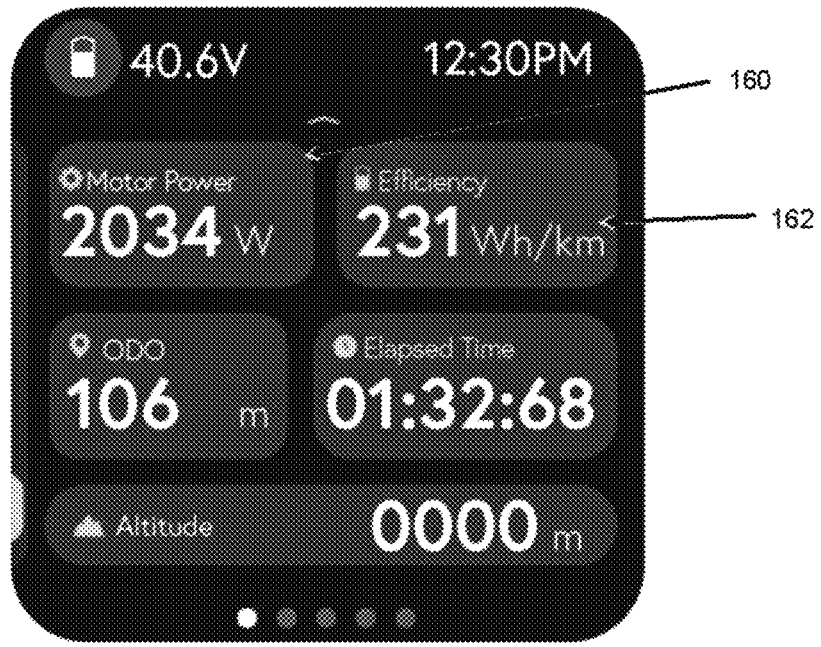
Figure 22:
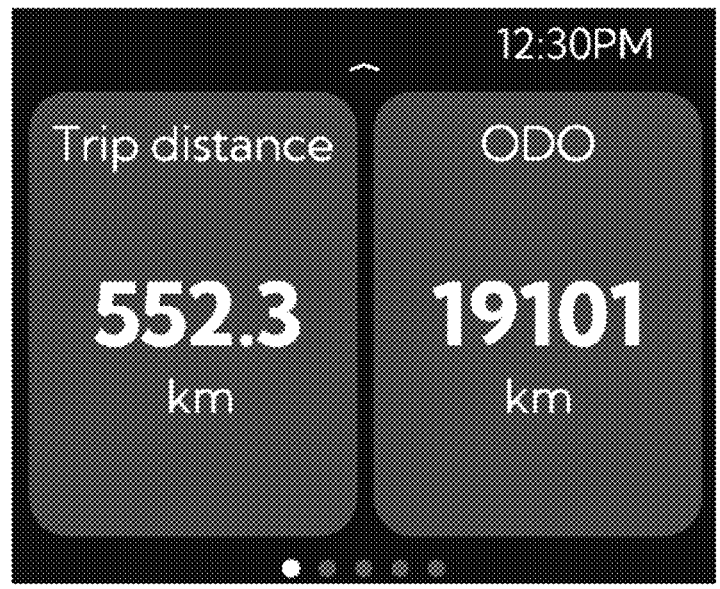
Figure 23:
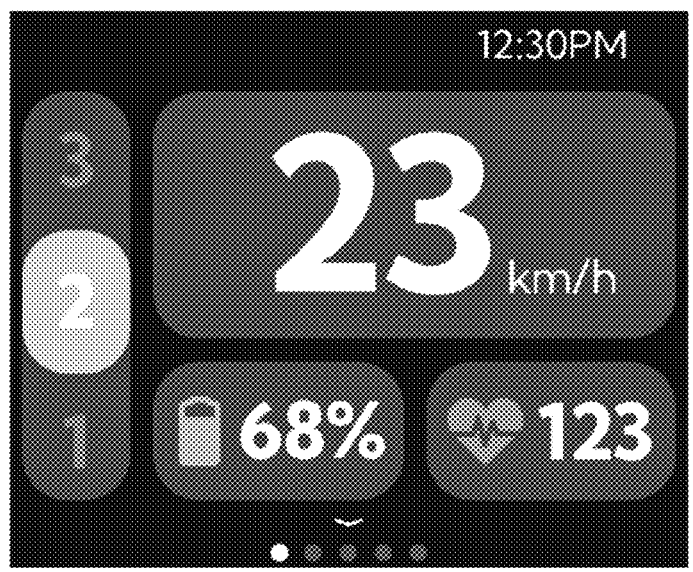
Figure 24:
Figure 25:
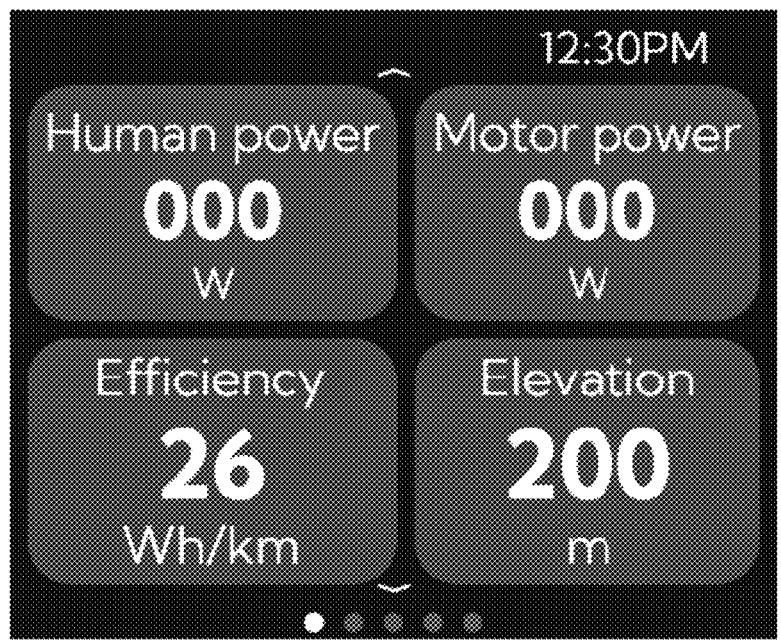

FIGS. 20 to 25 show a number of exemplary screen shots displayed on the visual display unit 140. Turning to FIG. 20, the voltage reading 150 is read from the motor controller, and the Average Speed reading 152 and the Maximum Speed reading 154 are based on data obtained from the speed sensor.

The Cadence reading 156 is obtained from the dual Hall sensor 72. As for the Human Power reading 158, such is calculated based on the following equation:

$$\text{Torque (in average)} = \frac{\text{Power}}{(\text{Cadence} * 2\pi)/60}$$

$$\therefore \text{Power} = \text{Torque} * \frac{(\text{Cadence} * 2\pi)}{60}$$

The average torque value is used for preventing fluctuation of the output value.

The Motor Power reading 160 is calculated based on the following equation:

$$\text{Power} = \text{Voltage} * \text{Current}$$

The Efficiency reading 162 is calculated based on the following equation:

$$\text{Efficiency} = \frac{\text{Motor Power (in average)} * \text{Time}}{\text{Distance}}$$

The above torque sensing system 31 or a power control system incorporating the controller and the torque sensing system 31 may be incorporated in a conversion kit for converting a manually-driven vehicle (e.g. a bicycle) to an electric or power-assisted bicycle. A vehicle (e.g. a bicycle) may also include the above torque sensing system 31, the power control system incorporating the controller and the torque sensing system 31, or the above mentioned conversion kit.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:
1. A torque sensing system including:
  a first part with an electricity transmission member, and
  a second part rotatable relative to said first part about an axis of rotation, and having:

a cylindrical body fixedly engageable with a vehicle spindle for receiving torque input from said vehicle spindle and simultaneous rotation about said axis of rotation, the body having an outer circumferential surface for engagement with and transmitting said torque input to a one-way clutch, four strain gauges being equi-angularly disposed on and around the body, and fixedly engaged with said body for sensing torque applied on said body and outputting torque-related signals representing the magnitude of said torque applied on said body, the strain gauges being electrically connected in series, an electricity receiving member for wirelessly receiving electricity transmitted by said electricity transmission member of said first part, and a first printed circuit board having a first major surface which is perpendicular to said axis of rotation.

2. The torque sensing system according to claim 1, wherein said second part is rotatably supported by at least one bearing.

3. The torque sensing system according to claim 1, further including a first hole allowing insertion of at least a part of said vehicle spindle for engagement of said system with said vehicle spindle for simultaneous rotation about said axis of rotation.

4. The torque sensing system according to claim 1,
wherein said electricity transmission member includes a first microprocessor, and
wherein said second part includes a second microprocessor which is data-transmissible wirelessly with said first microprocessor.

5. The torque sensing system according to claim 1,
wherein said electricity transmission member includes a first metal coil, and
wherein said electricity receiving member includes a second metal coil which is electricity-transmissible wirelessly with said first metal coil.

6. The torque sensing system according to claim 1, wherein said first part includes a second printed circuit board having a second major surface which is perpendicular to said axis of rotation.

7. The torque sensing system according to claim 1, wherein said electricity transmission member includes a third major surface which is perpendicular to said axis of rotation.

8. The torque sensing system of claim 1, wherein said one-way clutch is a one-way sprag clutch with a second hole receiving at least a part of said first printed circuit board.

9. The torque sensing system according to claim 8, wherein said second hole of said one-way sprag clutch receives at least one of a part of a magnet ring of said second part, a part of said electricity receiving member, and a part of said strain gauge.

10. The torque sensing system according to claim 1, further including at least one cadence sensor for sensing frequency of forward rotation and backward rotation of said vehicle spindle and outputting cadence-related signals representing said frequency of forward rotation and backward rotation of said vehicle spindle.

11. A power control system for an electric or power-assisted vehicle including:
a torque sensing system according to claim 10,
a controller for receiving said torque-related signals and said cadence-related signals and outputting operating signals at least partly on the basis of said torque-related signals and said cadence-related signals for operating a motor or engine operationally connected with said controller.

12. The power control system according to claim 11, wherein
said controller is adapted to receive said torque-related signals and said cadence-related signals, and
said controller is adapted to output operating signals to activate a motor or engine operationally connected with said controller to output power only if said cadence-related signals represent frequency of forward rotation of said vehicle spindle as being above a lower first threshold frequency and below a higher second threshold frequency.

13. The power control system according to claim 12, wherein, if said cadence-related signals represent the frequency of forward rotation of said vehicle spindle as being above said first threshold frequency and below said second threshold frequency, said controller is adapted to output operating signals to said motor or engine to output power if said torque-related signals represent said torque applied on said cylindrical part as being above a third threshold value.

14. The power control system according to claim 13, wherein said controller is adapted to output operating signals to stop operation of said motor or engine if said cadence-related signals represent frequency of forward rotation of said vehicle spindle as being below said first threshold frequency or above said second threshold frequency.

15. A vehicle including the power control system according to claim 11, wherein said controller is connected with a visual display unit for displaying at least one operation parameter of said vehicle.

16. The vehicle according to claim 15, wherein said visual display unit is adapted to display at least one physiological parameter of a rider of said vehicle.

17. The vehicle according to claim 16, wherein said visual display unit includes a touch screen and/or a physical button.

18. The vehicle according to claim 15, wherein said visual display unit is data-communicable with a smart phone through wired or wireless data connection.

* * * * *